(12) United States Patent
Tsai

(10) Patent No.: US 8,228,500 B2
(45) Date of Patent: Jul. 24, 2012

(54) REFLEX SIGHT

(75) Inventor: Chen-Shuo Tsai, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 407 days.

(21) Appl. No.: 12/608,132

(22) Filed: Oct. 29, 2009

(65) Prior Publication Data

US 2011/0102785 A1    May 5, 2011

(51) Int. Cl.
*G02B 27/10* (2006.01)
*G02B 23/10* (2006.01)
(52) U.S. Cl. .......................................... 356/251; 359/618
(58) Field of Classification Search .................. 356/251; 359/15
See application file for complete search history.

(56) References Cited

U.S. PATENT DOCUMENTS

| | | | | |
|---|---|---|---|---|
| 5,483,362 A * | 1/1996 | Tai et al. | ............................ | 359/1 |
| 5,815,936 A * | 10/1998 | Sieczka et al. | .................. | 42/115 |
| 2004/0047586 A1 * | 3/2004 | Schick et al. | ................. | 385/147 |
| 2008/0144181 A1 * | 6/2008 | Pniel | ............................ | 359/618 |

* cited by examiner

*Primary Examiner* — Michael P Stafira

(74) *Attorney, Agent, or Firm* — Thomas, Kayden, Horstemeyer & Risley, LLP

(57) ABSTRACT

A reflex sight is provided, including a first lens module, a first light source, and a second light source. The first light source projects a first reticle image to the first lens module, and the first lens module reflects the first reticle image to a viewer. When the first light source is inactive, the second light source projects a second reticle image to the first lens module, and the first lens module reflects the second reticle image to the viewer.

8 Claims, 2 Drawing Sheets

REFLEX SIGHT

BACKGROUND OF THE INVENTION

1. Field of the Invention

This application relates in general to a reflex sight and in particular to a reflex sight having at least two light sources.

2. Description of the Related Art

Reflex sights are optical or computing sights that reflect one or several reticle images, such as red dots, onto a combining glass for superimposition on a target. Reflex sights are commonly configured as non-magnifying firearm sights, without distorting the image of the target or reticle. The reflex sights are also used to aid targeting for other devices, such as telescopes and point-and-shoot digital cameras.

Referring to FIG. 1, a conventional reflex sight 100 usually includes a battery powered LED 110 provided for illumination of the reticle. The reflex sight 100 further includes a lens module 120 with a reflective coating film 121 formed therein. The LED 110 emits light through the path P, and light is reflected by the coating film 121 to the viewer along the axis C, as the arrows indicate in FIG. 1. Hence, the viewer can see the field of view and a reflection of the projected reticle (e.g. a red dot) simultaneously. Since the reticle is illuminated by the battery powered LED 100, the reticle pattern will not be shown if battery power of the LED 100 is expired or the LED 100 is defective.

BRIEF SUMMARY OF INVENTION

The application provides an electronic device including a first lens module, a first light source, and a second light source. The first light source projects a first reticle image to the first lens module, and the first lens module reflects the first reticle image to a viewer. When the first light source is inactive, the second light source projects a second reticle image to the first lens module, and the first lens module reflects the second reticle image to the viewer.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
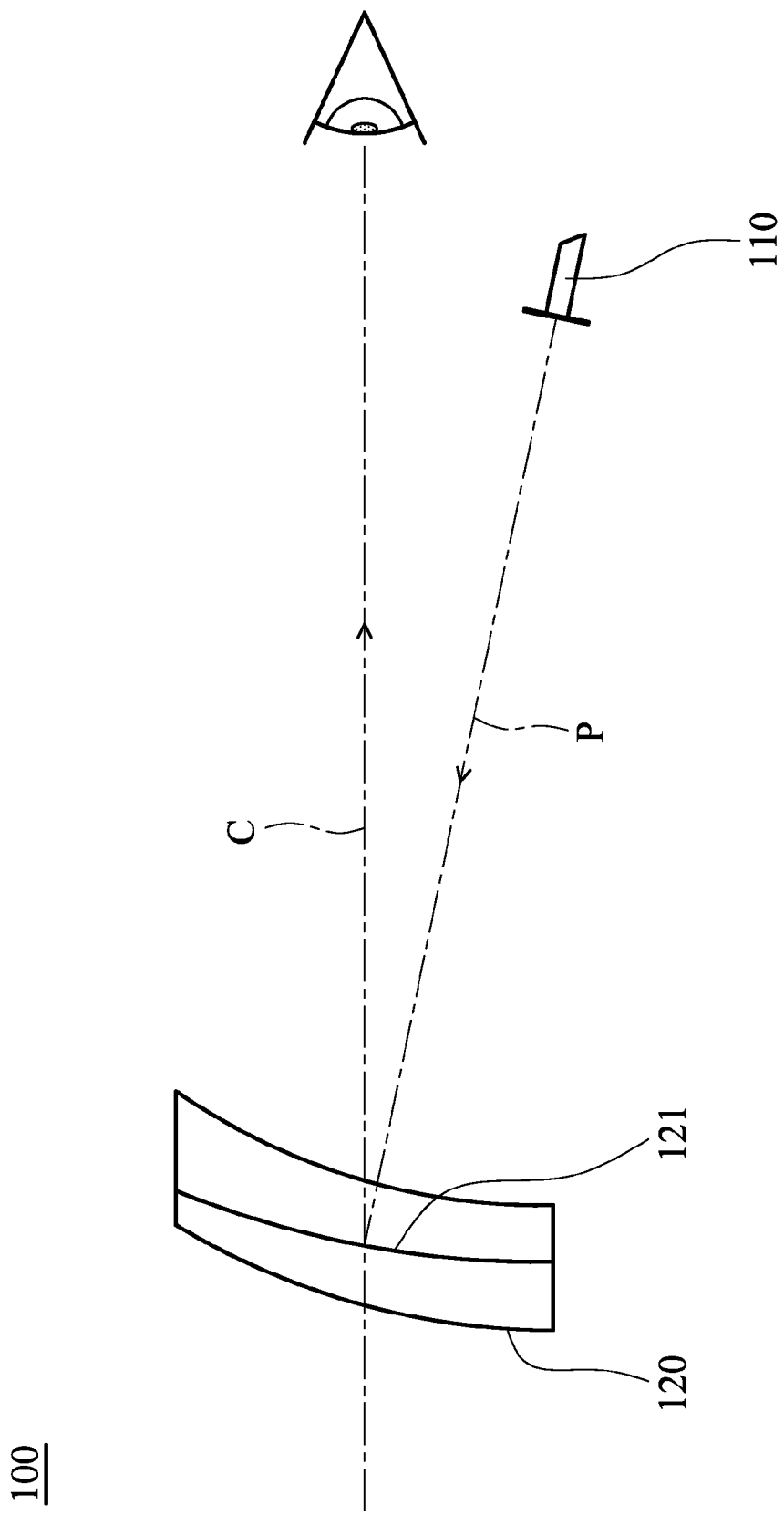
FIG. 1 is a perspective diagram of a conventional reflex sight having a light source.
Figure 2:
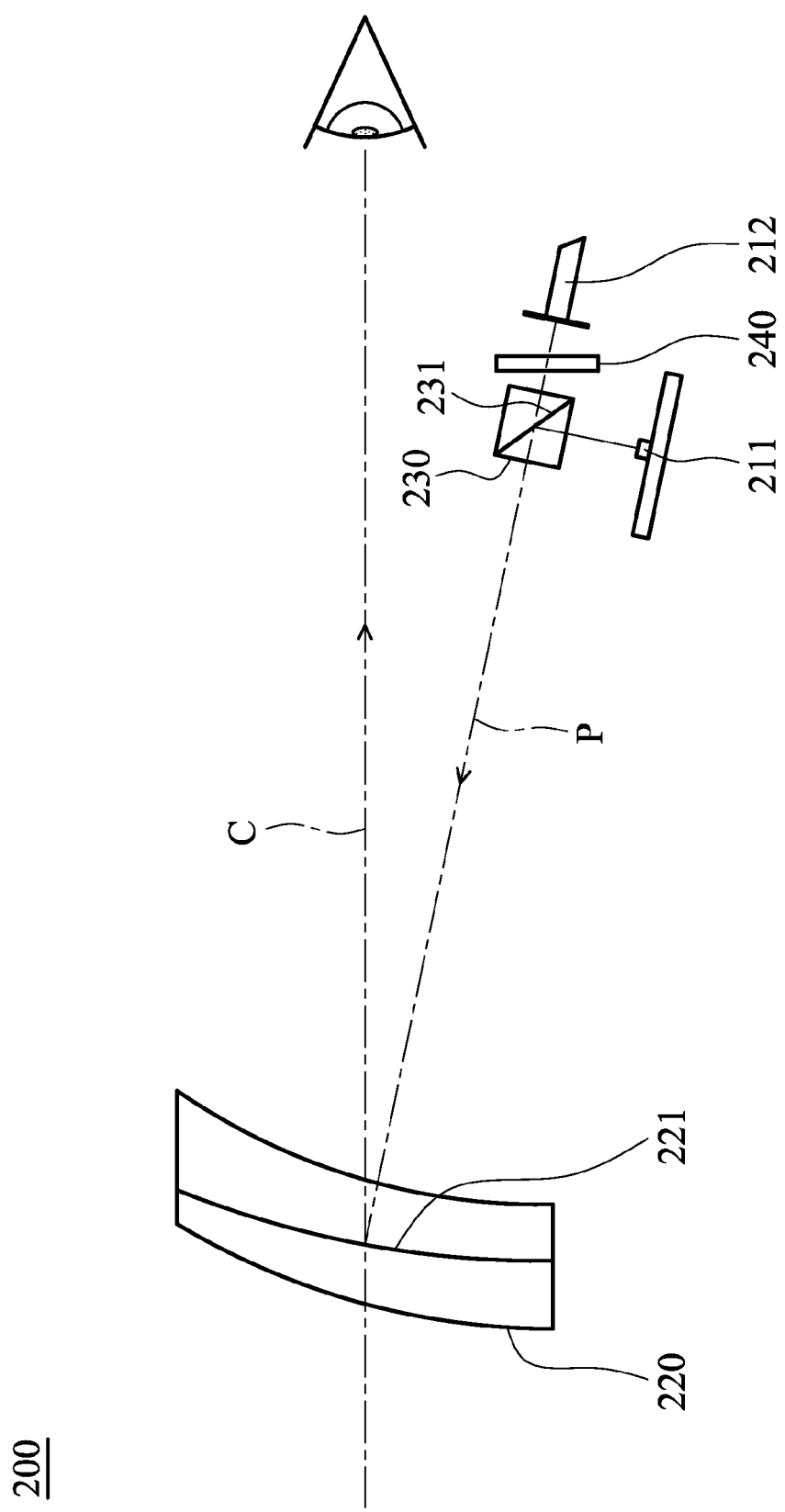
FIG. 2 is perspective diagram of a reflex sight having two light sources according to an embodiment of the invention.

Referring to FIG. 2, an embodiment of the reflex sight 200 can be applied in gun sights and camera view finders, as examples. The reflex sight 200 primarily comprises a first light source 211, a second light source 212, a first lens module 220, a second lens module 230, and an optical grating device 240 disposed between the second light source 212 and the second lens module 230.

The first light source 211 may be a battery powered LED which emits a first reticle image to the first lens module 220 through the path P. The first reticle image, such as a red dot, is reflected by a coating film 221 of the first lens module 220 to the viewer along the axis C. In this embodiment, the first lens module 220 may comprise a dichroic mirror or beam splitter, and the coating film 230 may comprise a semi-transparent, semi-reflective layer for superimposition of the reticle and the target.

The second light source 212 is utilized as a back-up light source, such as a fiber optic light source comprising an ambient light collector for receiving ambient light or solar light. When the first light source 211 is in normal use, a coating film 231 of the second lens module 230 reflects light from the first light source 211 to the first lens module 220, and the optical grating device 240 blocks light from the second light source 212 to the second lens module 230.

Specifically, when the first light source 211 is inactive (defective or out of power), the optical grating device 240 can be removed or switched to allow light to transmit from the second light source 212 to the second lens module 230. In this embodiment, the second lens module 230 may comprises a dichroic mirror or beam splitter allowing light to transmit from the second light source 212 to the second lens module 230. The coating film 231 may comprise a semi-transparent, semi-reflective layer for illumination of a second reticle image from the second light source 212. The second reticle image is transmitted from the second light source 212 through the second lens module 230, and reflected by the first lens module 220 to the viewer along the path C, such that the second reticle image is superimposed on the target.

The invention provides a reflex sight comprising at least two light sources for illumination of a reticle. When a light source is defective or out of power, a back-up light source can be utilized, thus improving convenience of usage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A reflex sight, comprising:
   a first lens module;
   a first light source, projecting a first reticle image to the first lens module, wherein the first reticle image is reflected by the first lens module to a viewer;
   a second light source, projecting a second reticle image to the first lens module when the first light source is inactive, wherein the second reticle image is reflected by the first lens module to the viewer; and
   an optical grating device, blocking light from the second light source when the first light source is active.

2. The reflex sight as claimed in claim 1, wherein the first light source comprises an LED.

3. The reflex sight as claimed in claim 1, wherein the second light source is a fiber optic light source.

4. The reflex sight as claimed in claim 1, wherein the second light source comprises an ambient light collector for receiving ambient light.

5. The reflex sight as claimed in claim 1, wherein the first lens module comprises a dichroic mirror or beam splitter.

6. The reflex sight as claimed in claim 1, wherein the reflex sight further comprises a second lens module reflecting the first reticle image from the first light source to the first lens module.

7. The reflex sight as claimed in claim 6, wherein the second lens module comprises a dichroic mirror or beam splitter.

8. The reflex sight as claimed in claim 1, wherein the optical grating device is disposed between the second light source and the second lens module.

* * * * *